US012055743B2

(12) United States Patent
Valdez et al.

(10) Patent No.: US 12,055,743 B2
(45) Date of Patent: Aug. 6, 2024

(54) CONFIGURABLE BOARD MOUNT LIGHT PIPE ARRAY

(71) Applicant: Bivar, Inc., Irvine, CA (US)

(72) Inventors: Angelito T. Valdez, Anahiem, CA (US); Vinit Sabharwal, Irvine, CA (US); Michael Pagdonsolan, Beaumont, CA (US)

(73) Assignee: BIVAR, INC., Irvine, CA (US)

( * ) Notice: Subject to any disclaimer, the term of this patent is extended or adjusted under 35 U.S.C. 154(b) by 0 days.

(21) Appl. No.: 18/233,128

(22) Filed: Aug. 11, 2023

(65) Prior Publication Data

US 2024/0053525 A1 Feb. 15, 2024

Related U.S. Application Data

(60) Provisional application No. 63/397,954, filed on Aug. 15, 2022.

(51) Int. Cl.
*F21V 8/00* (2006.01)
*H01R 13/717* (2006.01)

(52) U.S. Cl.
CPC ........ *G02B 6/0006* (2013.01); *H01R 13/7172* (2013.01)

(58) Field of Classification Search
CPC ............................ G02B 6/0006; H01R 13/7172
USPC ........................................ 362/555, 551, 433
See application file for complete search history.

(56) References Cited

U.S. PATENT DOCUMENTS

| 4,802,725 A | * | 2/1989 | Borne | ................. | G02B 6/4248 |
| | | | | | 385/88 |
| 4,887,876 A | | 12/1989 | Fricke et al. | | |
| 7,329,034 B2 | | 2/2008 | Verdes et al. | | |
| 9,350,108 B2 | | 5/2016 | Long | | |
| 10,698,167 B2 | | 6/2020 | DeMeritt et al. | | |
| 2005/0134527 A1 | * | 6/2005 | Ouderkirk | ............ | G02B 6/0006 |
| | | | | | 345/32 |
| 2013/0135890 A1 | * | 5/2013 | Jing | ..................... | G02B 6/0006 |
| | | | | | 29/595 |
| 2022/0102880 A1 | | 3/2022 | Huang et al. | | |

FOREIGN PATENT DOCUMENTS

CN 209198694 U 8/2019

* cited by examiner

*Primary Examiner* — Laura K Tso
(74) *Attorney, Agent, or Firm* — One LLP; David G. Duckworth

(57) ABSTRACT

A configurable board mount light pipe array is provided which includes four rails and one or more adapters. Each rail extends longitudinally and includes first and second ends which are connectable to the first and second ends of other rails to form a rectangular frame. The adapters are affixed within the middle of the rectangular frame. Each adapter includes a vertically extending center channel which extends entirely through the adapter. The top of each adapter's center channel includes a light pipe receptacle, and the bottom of the center channel includes an LED receptacle. The configurable board mount light pipe array further includes one or more light pipes which include first and second ends. The light pipes' first ends are positioned within a press-fit engagement within an adapter's light pipe receptacle and the light pipes' second ends are constructed to project through the holes of an electronic device panel.

16 Claims, 15 Drawing Sheets

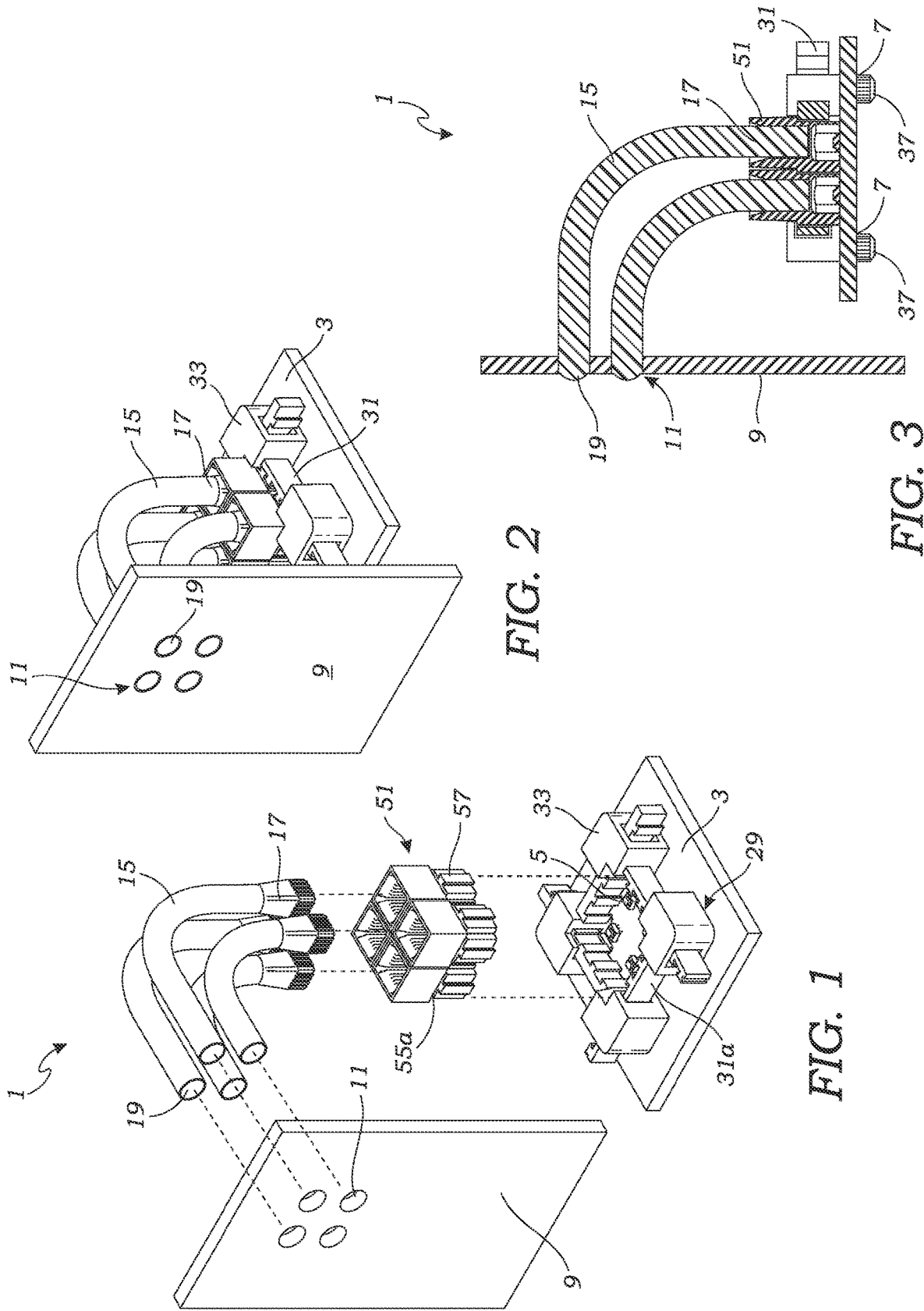

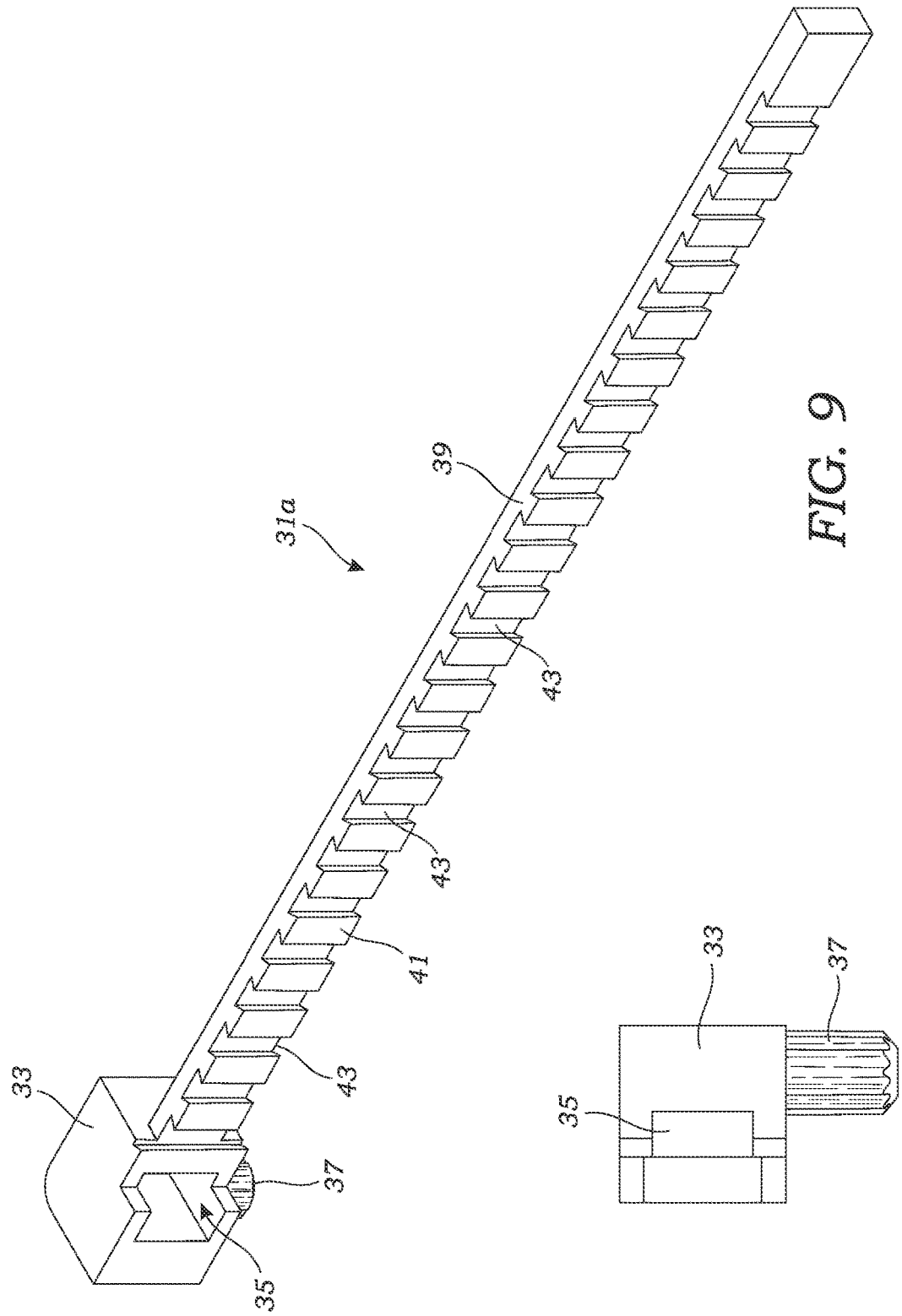

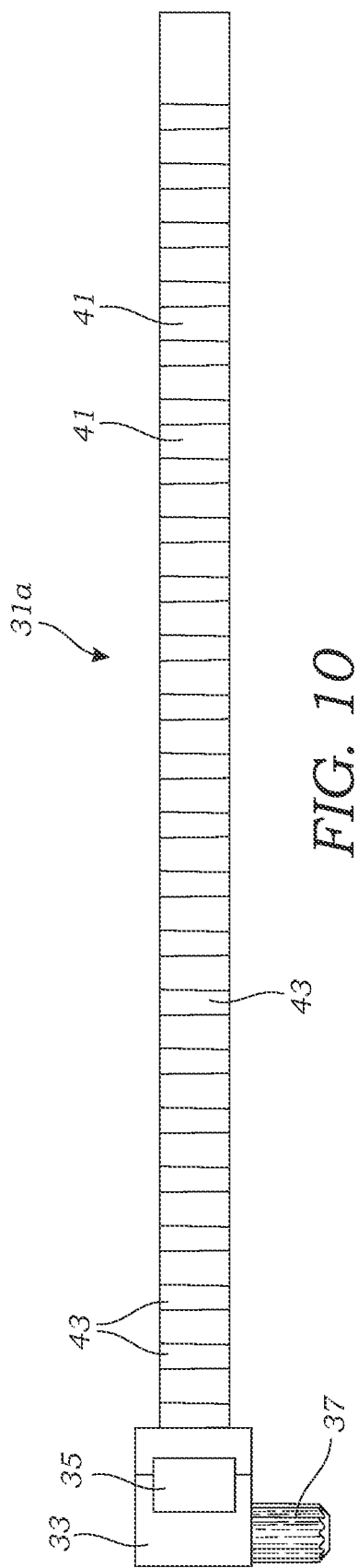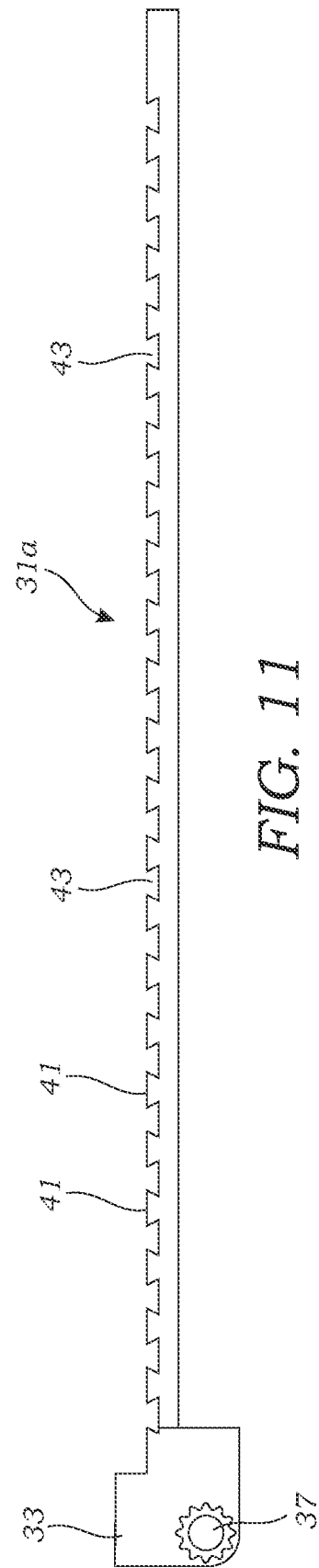

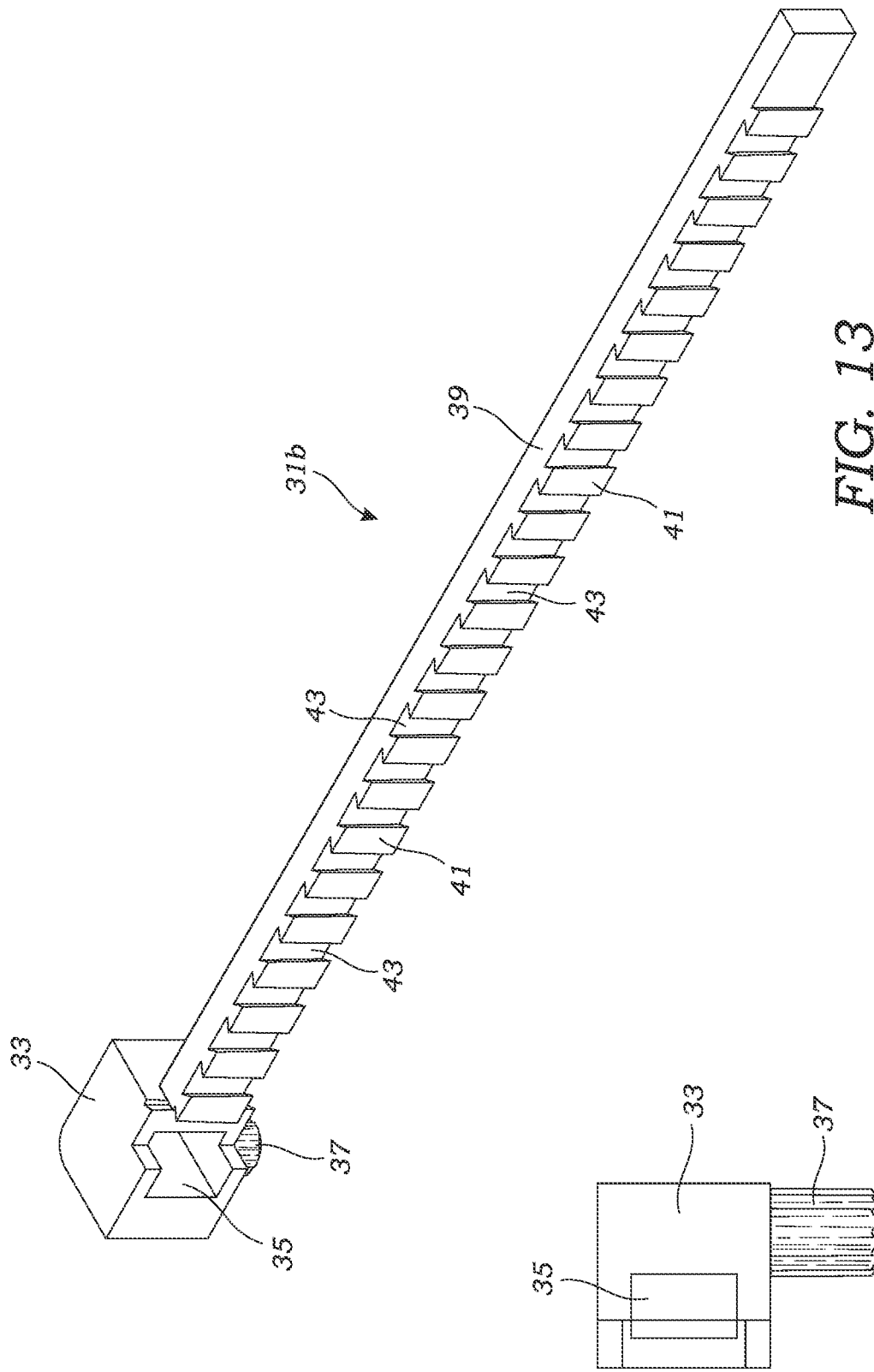

CONFIGURABLE BOARD MOUNT LIGHT PIPE ARRAY

CROSS-REFERENCE TO RELATED APPLICATIONS

The present application claims priority to U.S. Provisional Patent Application Ser. No. 63/397,954 filed on Aug. 15, 2022, which is incorporated herein by reference in its entirety.

BACKGROUND OF THE INVENTION

The present invention relates to array of one or more light pipes connected to one or more light emitting diodes (LEDs) mounted upon a printed circuit board (PCB).

Often it is necessary to mount visual indicators such as LEDs on a PCB. The LEDs can be mounted on the PCB to indicate any number of conditions including an indication of power, a processing condition, or an indication that an error in transmitting the signals has occurred. The number of LEDs upon a PCB varies depending on engineering and design requirements with the number of LEDs limited by the size of the PCB.

The LED visual indication must oftentimes be transmitted to the exterior panel of a electronic device. The transmission of light is accomplished using a light pipe which includes a first end positioned adjacent to an LED, and a second end that extends through a hole in a plate which forms the exterior of the electronic device. There are a variety of apparatus for connecting the end of a light pipe to a PCB adjacent to the LED. Typically, an end of a light pipe is affixed to a PCB using an adapter. An adapter is typically hollow for receiving the light pipe's end, and the adapter includes two or more pins which form a press fit engagement with holes formed in the PCB to affix the adapter and light pipe in place.

Unfortunately, the adapters are difficult to mount to a PCB and their pins require corresponding holes in the PCB. This arrangement takes up substantial space on the PCB which thereby limits the number of LEDs that can be mounted to a PCB.

Thus, there is a need for an easier-to-install system for mounting the ends of light pipes to a PCB.

Furthermore, there is a need for a system for mounting the ends of light pipes to a PCB that consumes less space upon a PCB.

SUMMARY OF THE INVENTION

A configurable board mount light pipe array is provided which includes a frame, one or more adapters, and one or more light pipes. The frame includes four longitudinally extending rails. Each rail includes a first end and a second end with the ends connectable to other rails to form a rectangular frame. The rails may be affixed to each other to form a rectangular frame by various connectors as can be determined by those skilled in the art. However, in a preferred embodiment, each of the four rails' second ends are constructed to form the corners of the rectangular frame with each corner including a slot to receive the first end of an adjacent rail. Preferably, each corner includes a downwardly extending pin intended to project into a hole formed within a PCB.

The adapters are constructed so as to be positioned within the middle of the rectangular frame. Each adapter includes a vertically extending center channel which extends entirely through the adapter. The top of each adapter's center channel includes a light pipe receptacle having a shape to receive an end of a light pipe. Conversely, the bottom of each center channel includes an LED receptacle which is sized and shaped to receive an LED which is mounted upon a PCB. The configurable board mount light pipe array may include any number of adapters, including only a single adapter. However, it is preferred that the configurable board mount light pipe array includes two or more adapters as the configurable board mount light pipe array is particularly suited for mounting a plurality of light pipes to an underlying PCB. Furthermore, the adapters may take various shapes. However, preferred adapters have four sides forming a square cross-section so that one or more adapters may be configured to fit within the center of the four-sided frame.

The adapters may be affixed with the frame's rectangular center by various connector constructions as can be determined by those skilled in the art. For example, the adapters may simply be adhered or welded to the frame without any additional attachment mechanism. However, in a preferred embodiment, the adapters are affixed either to other adapters, or to the frame, by tongue-and-groove connectors. In a preferred tongue-and-groove embodiment, each of the adapters have four sides and two adjacent adapter sides include a single vertically extending tongue and the other two adjacent adapter sides include a single vertically extending groove. The adapters tongues are sized and shaped to affix to the grooves of other adapters. Furthermore, for this embodiment, two of the rails are "tongue rails" which are positioned adjacent to one another in the frame and include tongues positioned to affix to the adapters' grooves. Meanwhile, the two remaining rails are "groove rails" which are adjacent to one another and include grooves positioned to affix to the adapters' tongues.

The configurable board mount light pipe array further includes light pipes which include first and second ends, with the light pipes' first ends positioned within a press-fit engagement within a corresponding adapter's light pipe receptacle. The light pipes may have any shape as necessary depending upon the position and angle of the PCB relative an electronic panel. Each light pipe's first end 17 may be constructed so as to have various shapes. However, it is preferred that the light pipes' first ends have a generally square shape so as to form a press-fit engagement within the adapters' light pipe receptacles which preferably also have a square shape. The adapters' light pipe receptacles may include deformable ridges so as to facilitate a press-fit engagement with the light pipes' first ends. The configurable light pipe array may include any number of light pipes which preferably correspond in number to the number of adapters.

In operation, the configurable board mount light pipe array is affixed to an underlying PCB with an adapter positioned immediately above each LED. The rail and adapter assembly is affixed to the PCB by the rails' pins projecting downwardly in a press-fit engagement to holes formed in the PCB. Meanwhile, the light pipes' second ends are then positioned to project through the holes of an electronical panel so that the distal ends of the light pipes are visible.

Advantageously, the configurable board mount light pipe array takes up less space on the PCB than previous constructions.

Furthermore, the configurable board mount light pipe array is easier to install than previous constructions.

BRIEF DESCRIPTION OF THE DRAWINGS

FIG. 1 is an exploded perspective view of a first embodiment of a configurable board mount light pipe array;

FIG. 2 is a non-exploded perspective view of the configurable board mount light pipe array shown in FIG. 1;

FIG. 3 is a side cutaway view of the configurable board mount light pipe array shown in FIGS. 1 and 2;

FIG. 8 is a left side plan view of a groove version of a rail which forms part of the configurable board mount light pipe array;

FIG. 9 is a perspective view of the groove version of rail shown in FIG. 8;

FIG. 10 is a front view of the groove version of rail shown in FIG. 8;

FIG. 11 is a bottom view of the groove version of rail shown in FIG. 8;

FIG. 12 is a left side view of a tongue version of a rail which forms part of the configurable board mount light pipe array;

FIG. 13 is a perspective view of the tongue version of rail shown in FIG. 12;

DETAILED DESCRIPTION OF THE INVENTION

Figure 4:
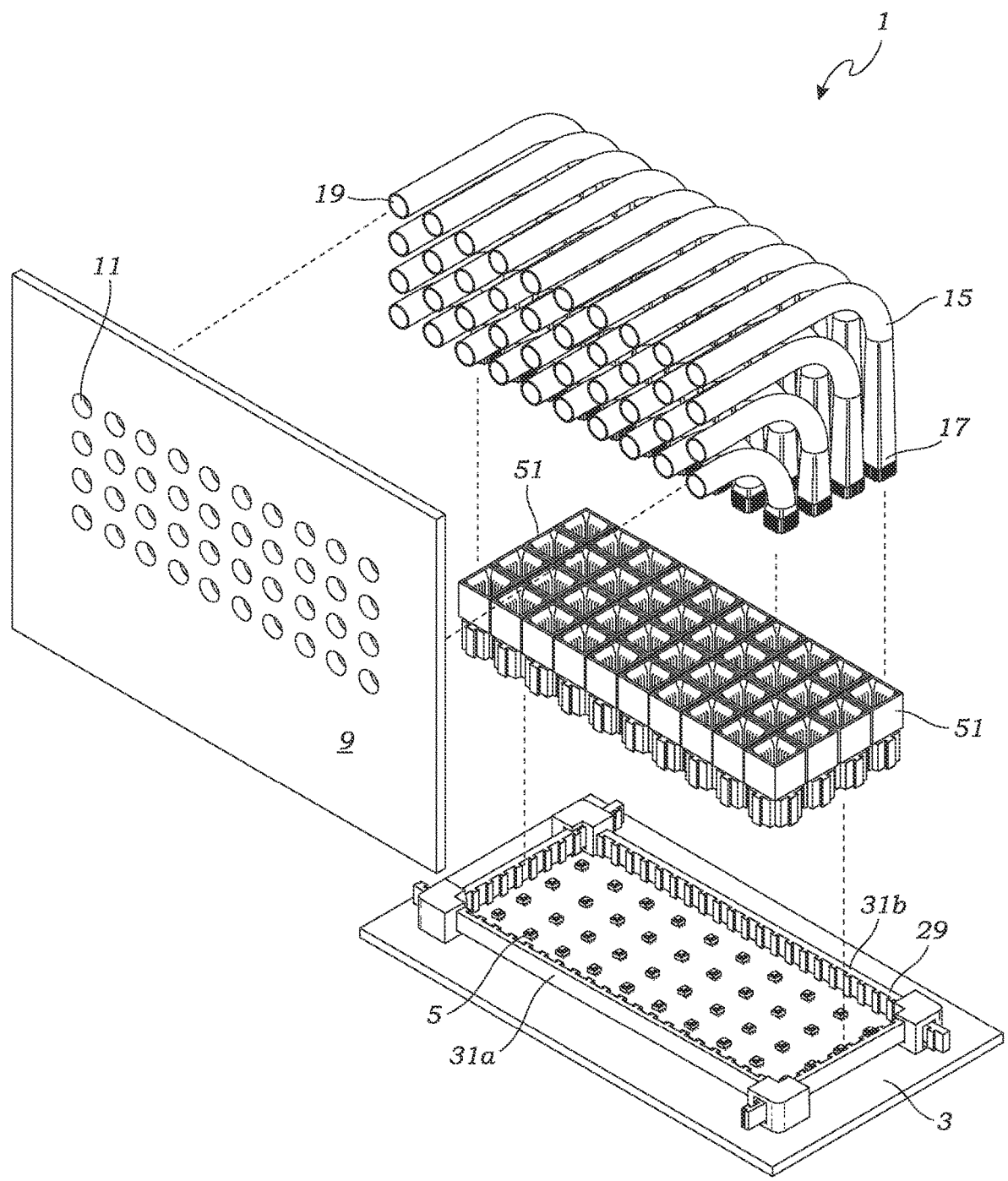
FIG. 4 is an exploded perspective view of a second embodiment of a configurable board mount light pipe array.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

The present invention addresses the aforementioned disadvantages by providing a configurable board mount light pipe array 1. With reference to FIGS. 1-26, the configurable board mount light pipe array 1 includes four rails 31, one or more adapters 51, and one or more light pipes 15 for transmitting light from LEDs 5 mounted on a PCB to a plate 9. With reference to all of the Figures, but primarily to FIGS. 8-15, the configurable board mount light pipe array's four rails 31 include two groove rails 31a and two tongue rails 31b. Each rail 31 includes a corner 33, a pin 37, and an arm 39.

Figure 6:
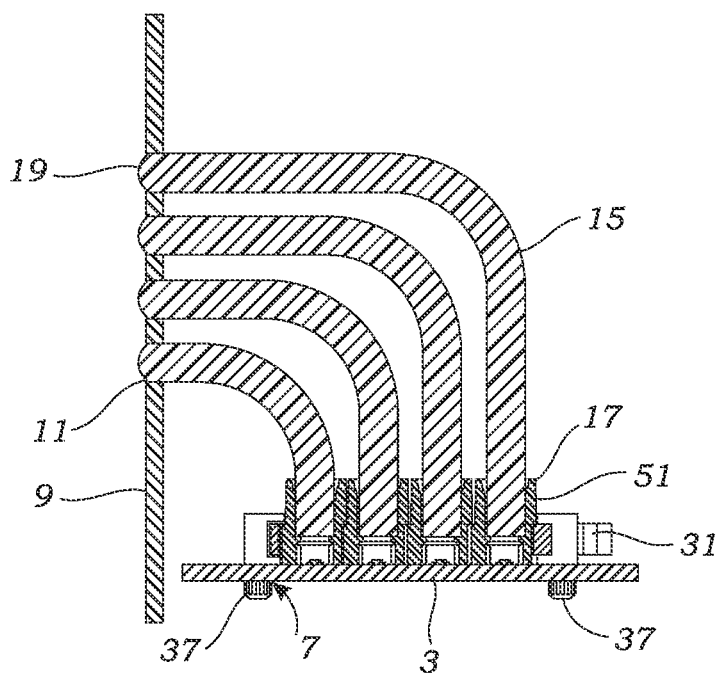
FIG. 6 is a side cutaway view the second embodiment of the configurable board mount light pipe array shown in FIGS. 4 and 5.
Figure 23:
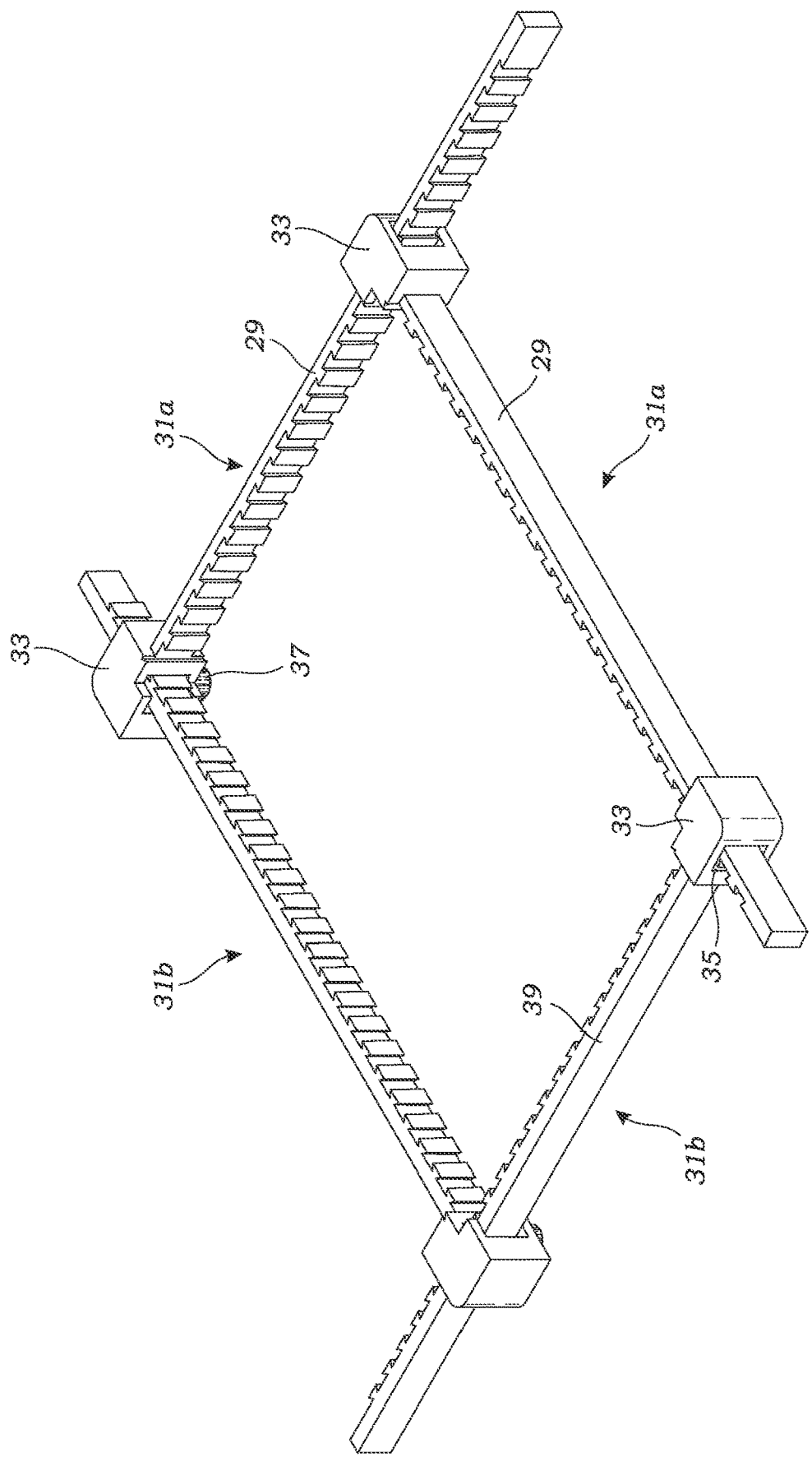
FIG. 23 is a non-exploded perspective view of the four rails shown in FIG. 22.
Figure 24:
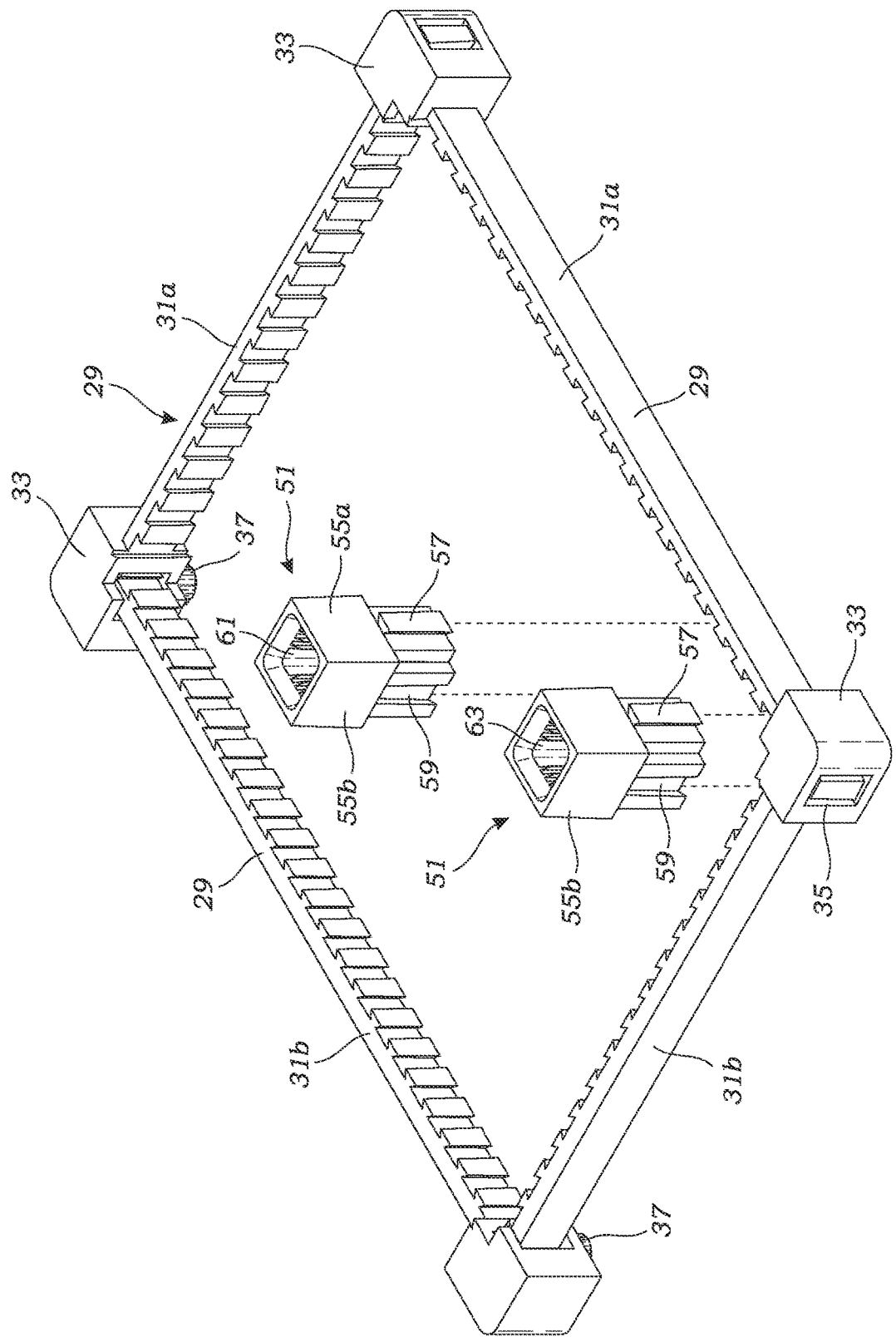
FIG. 24 is a perspective view of the configurable board mount light pipe array as two adapters are being installed.

As illustrated in FIGS. 23 and 24, each of the rail's corners 33 include a slot 35 for receipt of another rail's arm 39. Each rail's pin 37 extends downwardly from a corner 33, and as illustrated in FIGS. 3 and 6, is intended to project through holes 11 formed through the PCB for attaching the configurable board mount light pipe array 1 to a PCB 3. The pins 37 may include a serrated deformable surface to facilitate a press-fit attachment to an underlying PCB.

With reference to FIGS. 8-15, both the groove rails 31a and tongue rails 31b include tongue and groove fastener constructions formed on the rails' arms 39. However, as explained in greater detail below, the grooves (but not tongues) of the groove rails 31a are primarily used for fastening to adapters 51 and the tongues (but not grooves) of the tongue rails 31b are primarily used for fastening to adapters 51. As illustrated in FIGS. 23-26, the configurable board mount light pipe array 1 includes two groove rails 31a which are positioned adjacent to one another, and two tongue rails 31b which are positioned adjacent to one another, but in an opposed relationship to the groove rails 31a to form a frame 29. As illustrated in the Figures, the rails 31 are positioned to form a frame 29 that is rectangular including four sides and four corners. Preferably, a pin 37 projects downwardly from each of the four corners. The rails 31 may be made of various materials, but are preferably made of plastic, with a preferred material being Nylon 6/6, UL94V-0, black.

Figure 25:
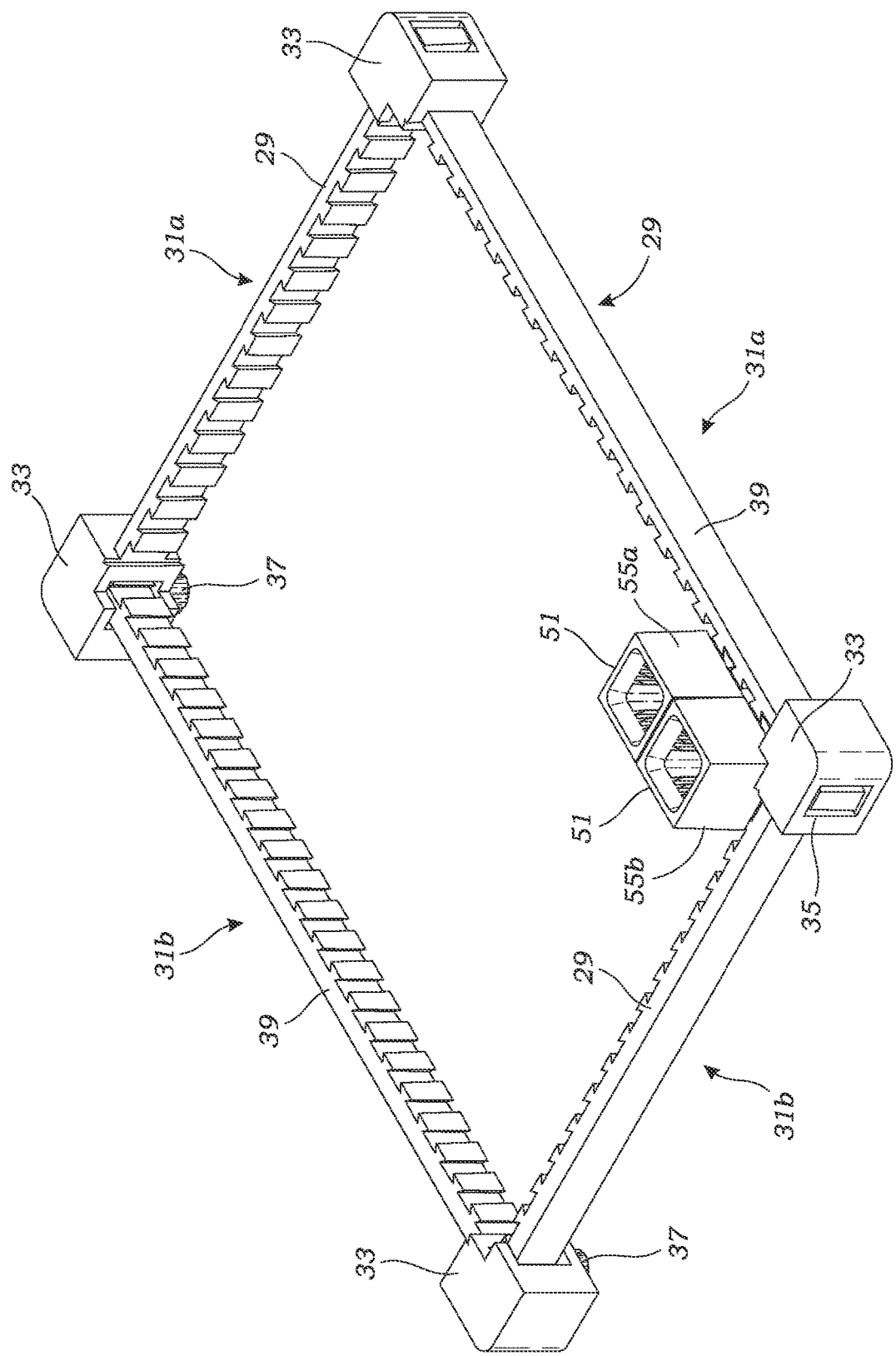
FIG. 25 is a perspective view of the configurable board mount light pipe array of FIG. 24 after the two adapters have been installed.
Figure 26:
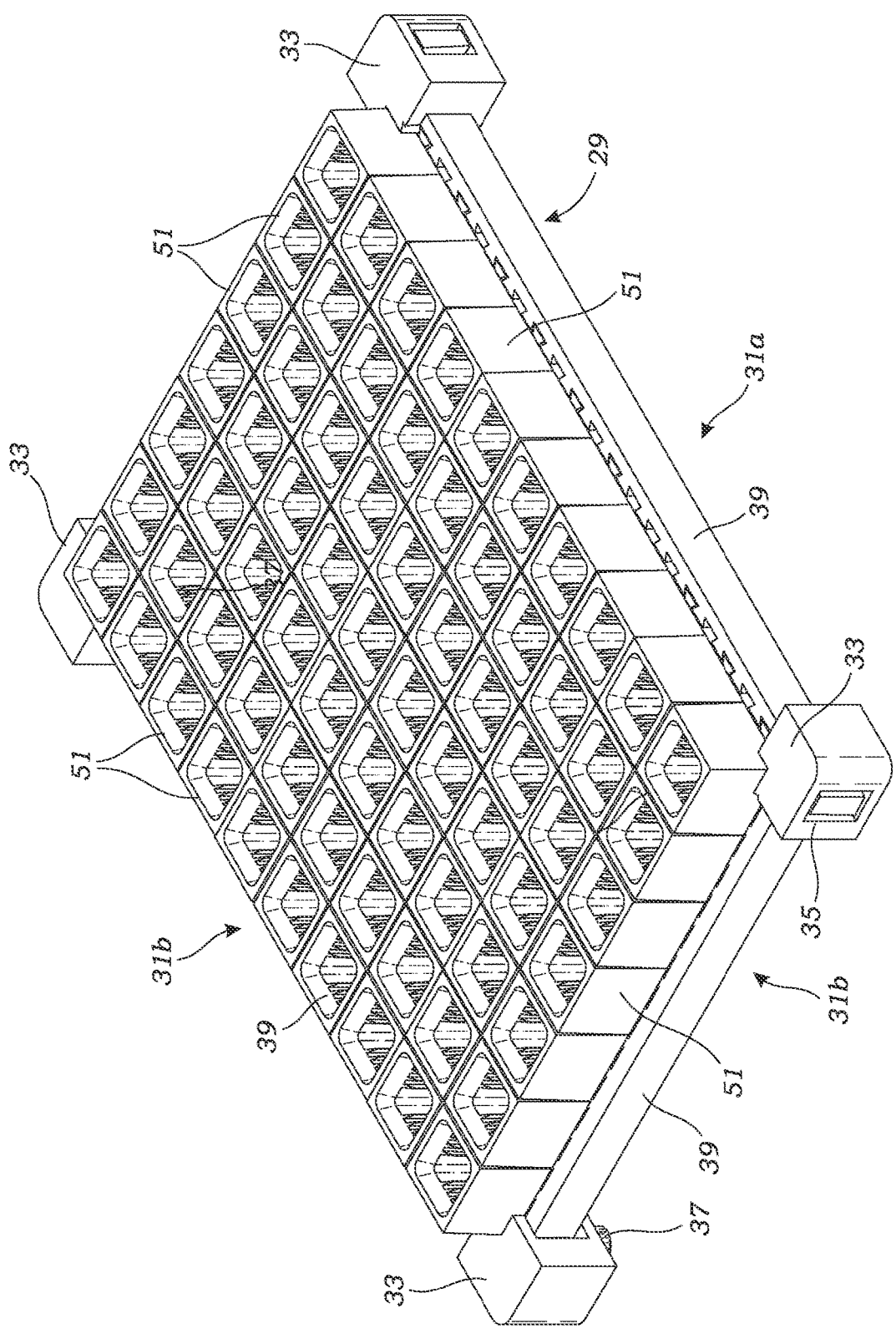
FIG. 26 is a perspective view of the configurable board mount light pipe array after seventy adapters have been installed and the ends of the rails have been cut and removed.

With reference to all of the Figures, but primarily to FIGS. 16-21, the configurable board mount light pipe array 1 includes one or more adapters 51. The adapters 51 have four sides and a center channel 61. Of the four sides 55, two of the sides 58 includes tongues 57 and are referred to as the adapter's tongue sides 55a. Each adapter 51 further includes two groove sides 55b which include grooves 59. With reference to FIGS. 24-26, the adapter's tongue sides 55a are adjacent to one another and the adapters groove sides 55b are adjacent to one another, in an opposing relationship to the tongue sides 55a so as to enable adapters to fasten to one another, and enable each adapter 51 to fasten to a rail 31. As seen in FIGS. 16-21, each adapter's center channel 61 includes a light pipe receptacle 63 which is sized to receive and provide a press-fit engagement. As seen in 1-6, the light pipe's first end 17 may be constructed so as to have various shapes. However, it is preferred that the light pipe's first end 17 have a generally square shape so as to form a press-fit engagement within the adapter's light pipe receptacle 63. The light pipe's receptacle 63 may include deformable ridges so as to facilitate a press-fit engagement with the light pipe's first end 17. As best seen in FIGS. 3, 6 and 16-21, each adapter's center channel 61 further includes an LED receptacle 65 which is sized and positioned to receive a PCB's LED 5. As would be understood by one skilled in the art, the adapters 51 are constructed so that an LED is positioned and maintained adjacent to the first end 17 of a light pipe 15. The adapters 51 may also be made or various materials, but are preferably made of plastic, with a preferred material being Nylon 6/6, UL94V-0, black.

Figure 5:
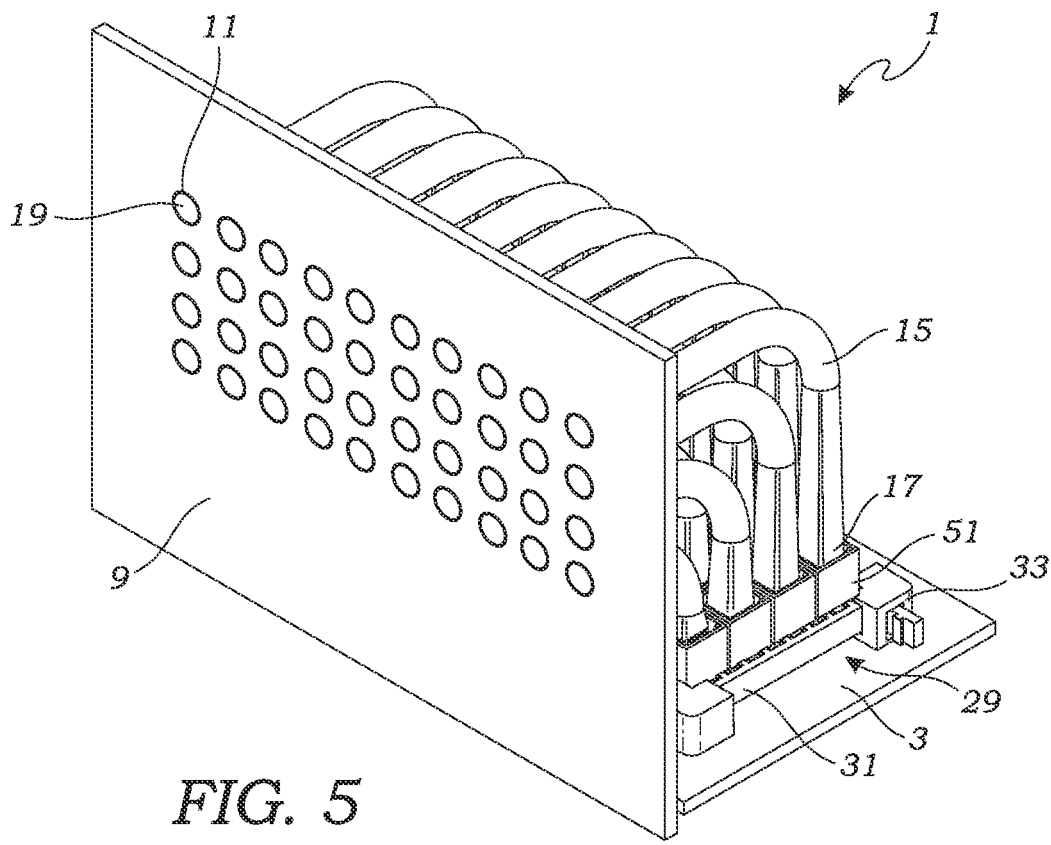
FIG. 5 is a non-exploded perspective view of the configurable board mount light pipe array shown in FIG. 4.
Figure 7:
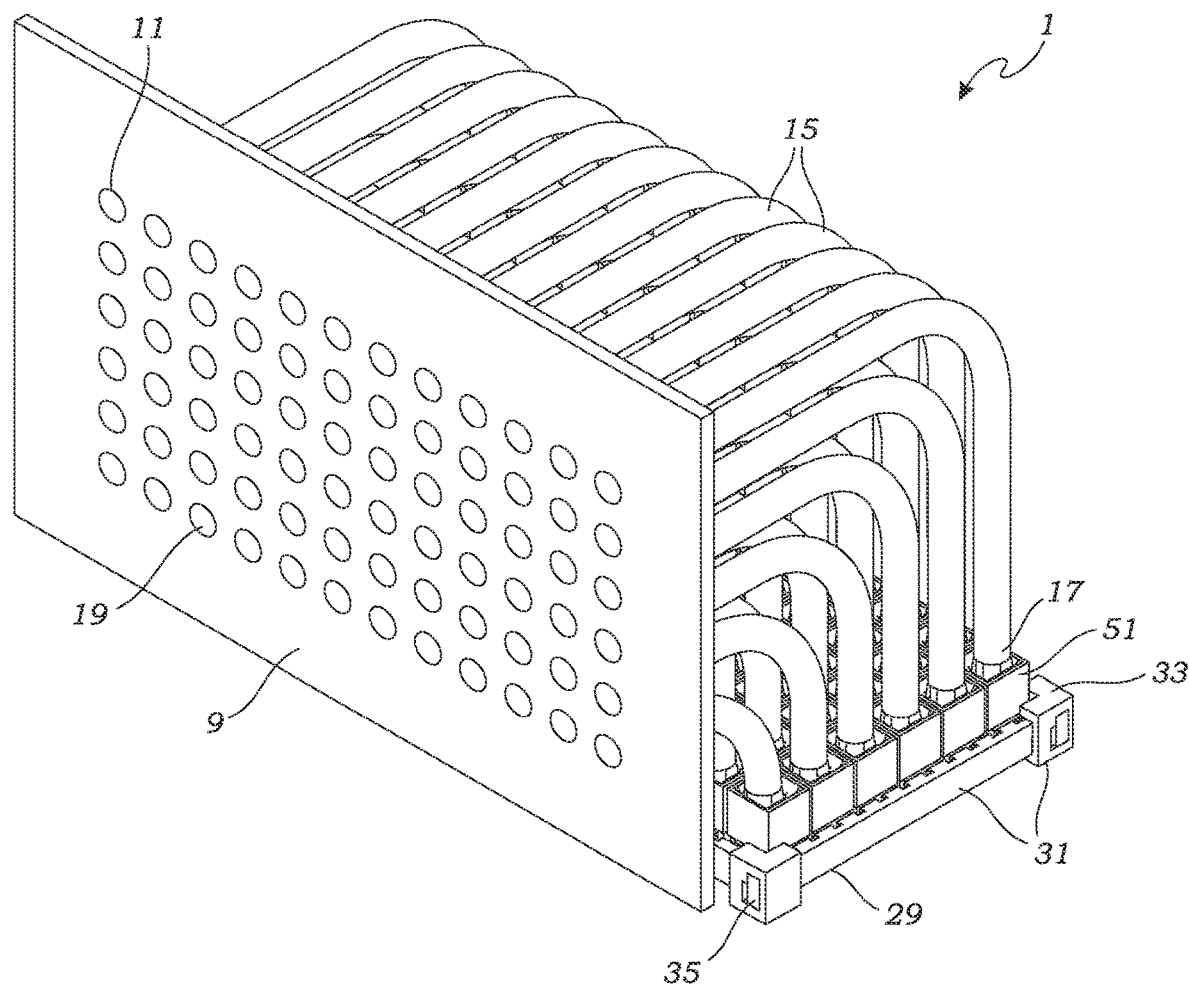
FIG. 7 is a perspective view of a third embodiment of a configurable board mount light pipe array.
Figure 14:
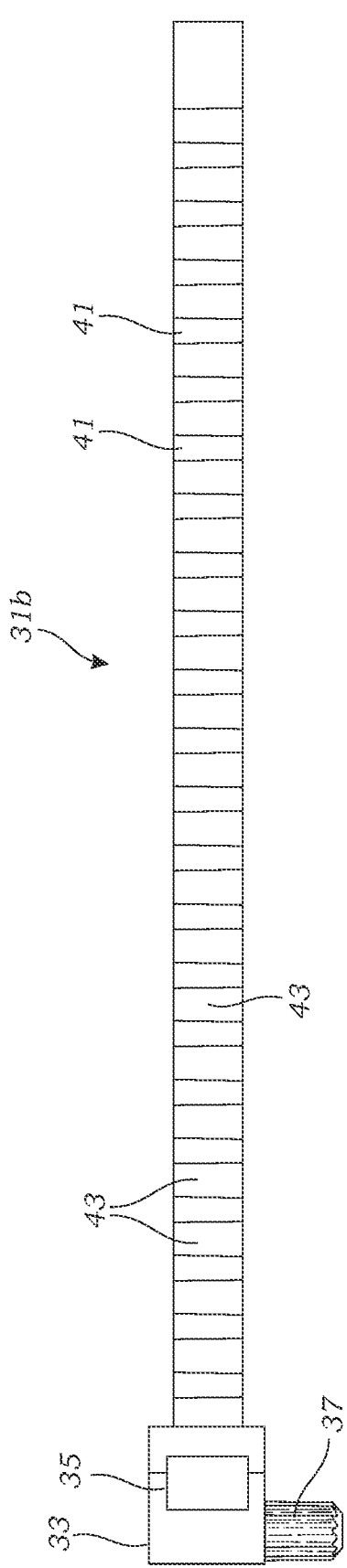
FIG. 14 is a front view of the tongue version of rail shown in FIG. 12.
Figure 15:
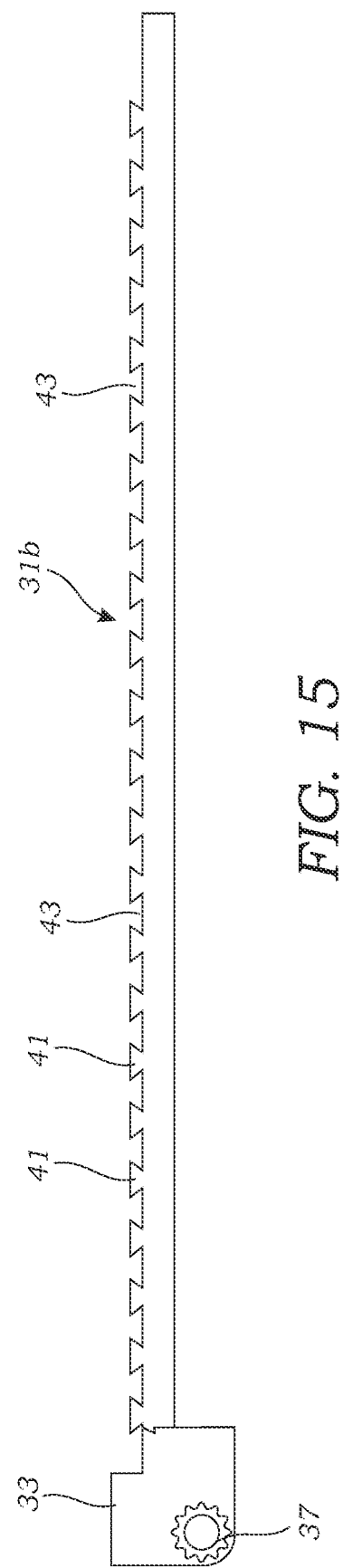
FIG. 15 is a bottom view of the tongue version of rail shown in FIG. 12.
Figures 16, 17:
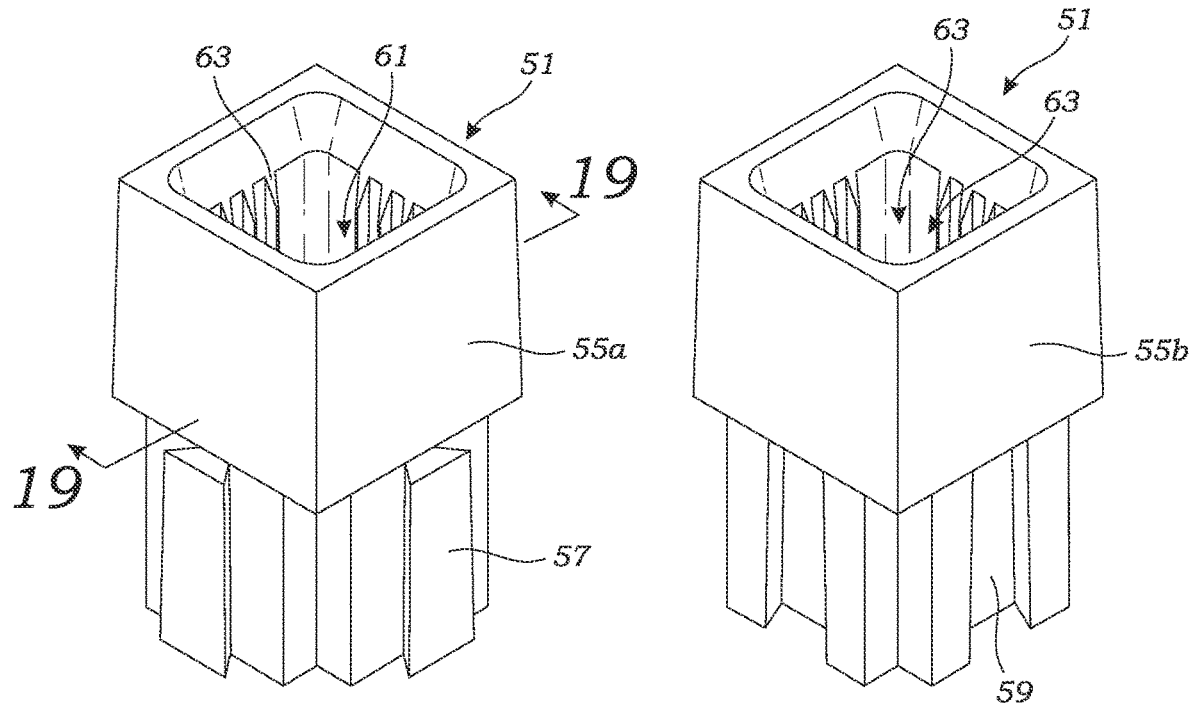
FIG. 16 is a front perspective view of an adapter which forms part of the configurable board mount light pipe array.
FIG. 17 is a rear perspective view of the adapter shown in FIG. 16.
Figures 18, 19:
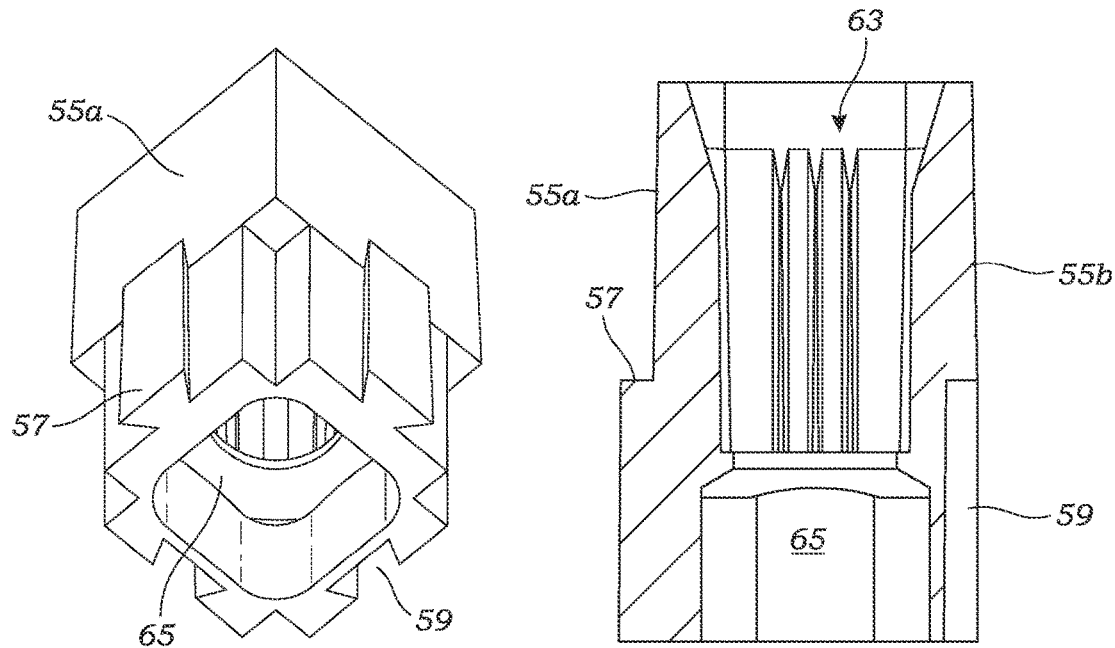
FIG. 18 is a front bottom perspective view of the adapter shown in FIG. 16.
FIG. 19 is a side cutaway view of the adapter shown in FIG. 16.
Figure 20:
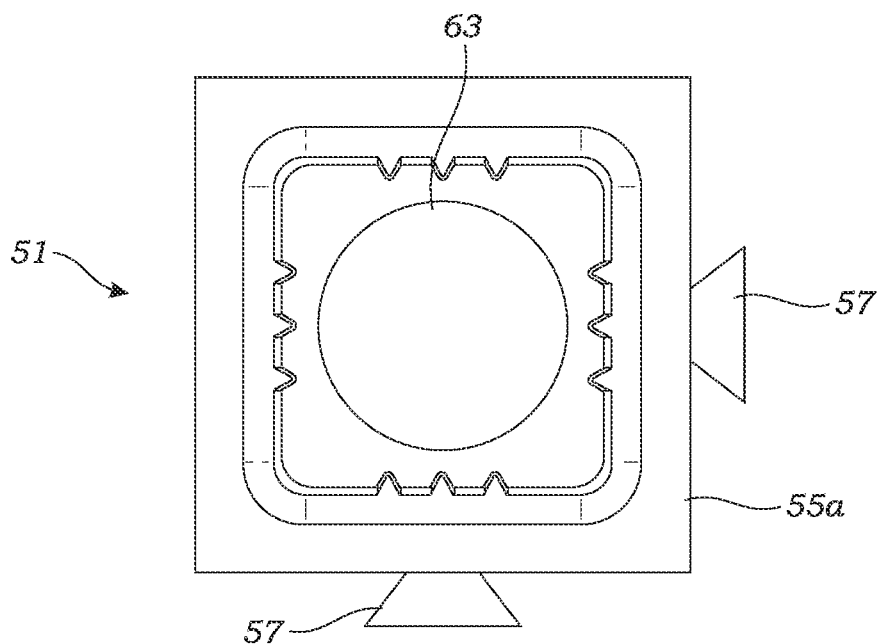
FIG. 20 is a top plan view of the adapter shown in FIG. 16.
Figure 21:
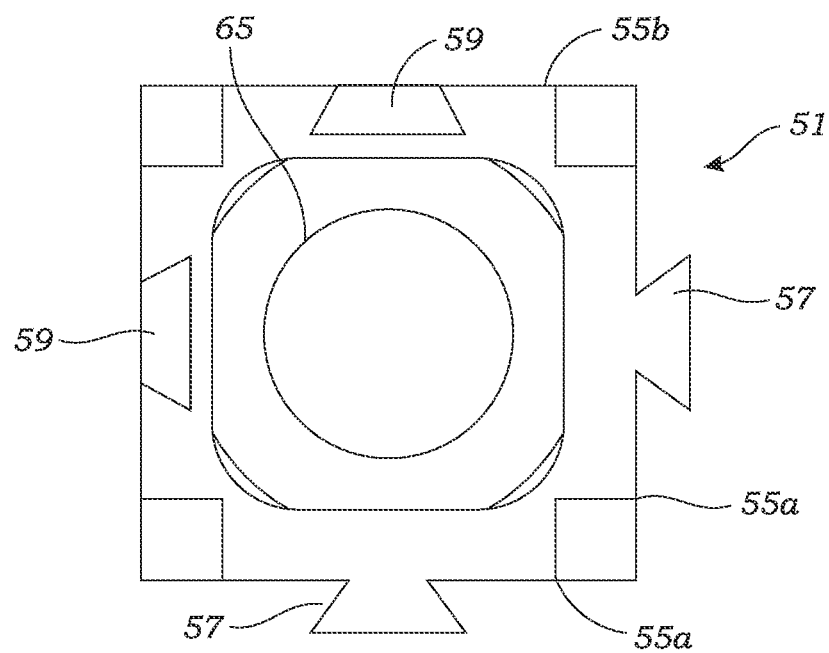
FIG. 21 is a bottom plan view of the adapter shown in FIG. 16.
Figure 22:
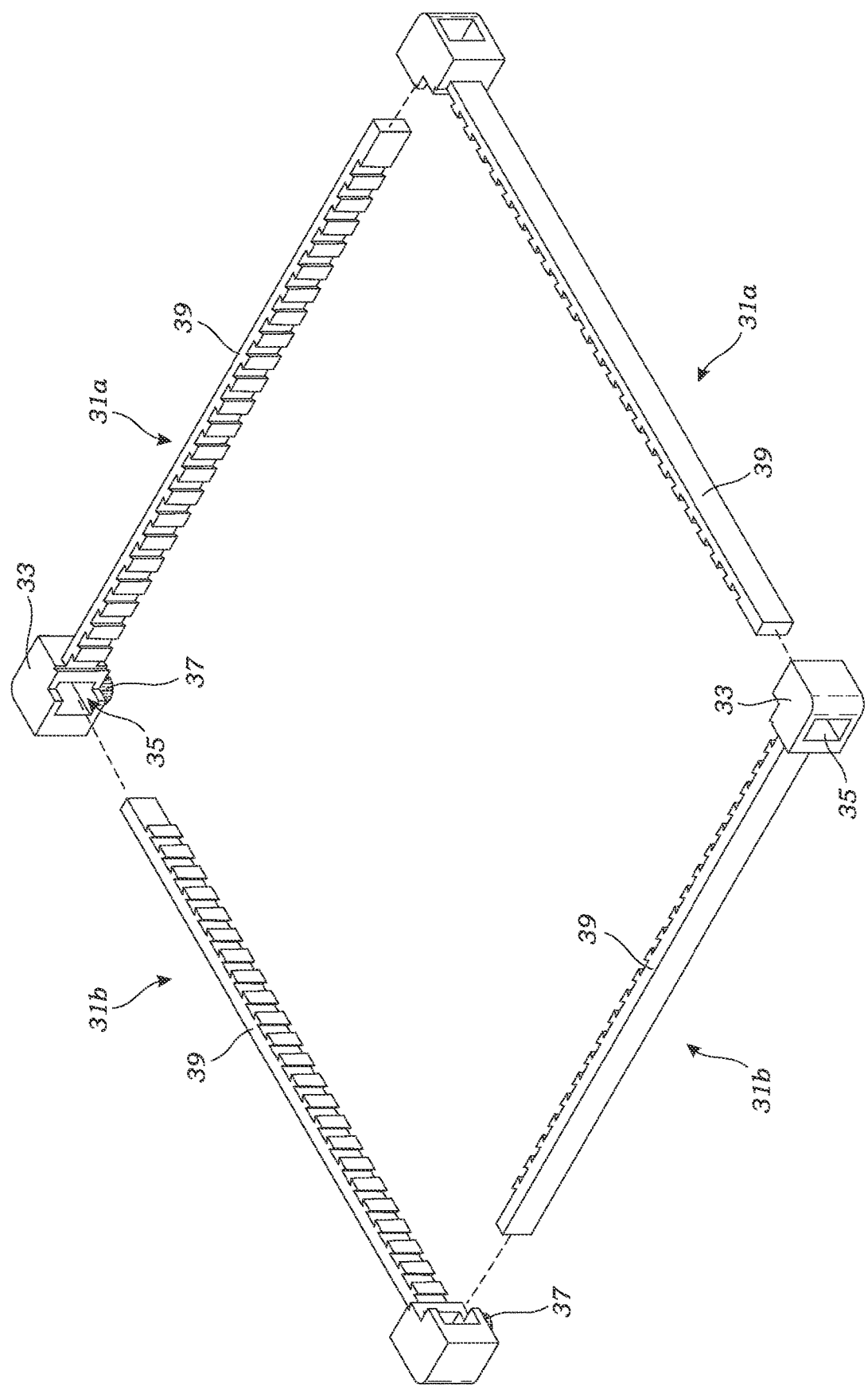
FIG. 22 is an exploded perspective view of the four rails which form part of the configurable board mount light pipe array.

The configurable board mount light pipe array 1 is configurable to work with a wide range in number in LEDs 5 in a variety of configurations upon a PCB 3 having apertures 7. For example, FIGS. 1-3 illustrate the configurable board mount light pipe array 1 for use with four LEDs 5 in a 2×2 pattern. FIGS. 4-6 illustrate a configurable board mount light pipe array 1 for use with 40 LEDs 5 in a 4×10 pattern. FIG. 7 illustrate a configurable board mount light pipe array 1 for use with 70 LEDs 5 in a 7×10 pattern.

With reference to FIGS. 8-15, preferably the rails 31 (including tongue rails 31*a* and groove rails 31*b*) are manufactured of standard lengths of sufficient length to support light pipe arrays of various sizes and configurations. Once a light pipe array configuration has been determined, such as illustrated in FIGS. 1-7, the first ends of each of the four rails 31 are slid through the slots of an adjacent rail until a rectangular frame 29 is created of a size and configuration to receive the desired number of adapters. The rails are arranged with two groove rails 31*a* positioned adjacent to one another and two tongue rails 31*b* positioned next to each other. As seen in FIG. 23, the rails are adjusted so as to be a rectangular sized to accept the desired number of adapters 51, which in turn corresponds to the number of LEDs on the PCB upon which the configurable board mount light pipe array 1 is intended to be mounted upon. Preferably, the ends of the rails 31 that project beyond the corners 33 are removed, such as by simply cutting off the ends with scissors or the like. Once the four rails 31 are correctly aligned, adapters 51 are inserted into the frame's center with adapter's tongues 57 inserted into rail's grooves 43, and adapters grooves 59 receiving rail's tongues 41. Adjacent adapters 41 are locked together by an adapter's tongue 57 entering into an adjacent adapter's groove 59. Adapters 51 are inserted into the array until all space is eliminated, as seen in FIG. 26.

Of course, the order in which the various components are assembled together may vary. For example, FIGS. 1 and 4 illustrate an assembly method wherein the frame 29 has been mounted to the PCB prior to the adapters 51 being affixed to the frame, and prior to the light pipes 15 engaging the adapters. Conversely, FIGS. 22-26 illustrate a method of assembling the configurable board mount light pipe array 1 wherein the frame 29 is assembled first, and thereafter the adapters 51 are placed individually into the frame. Of course, since the adapters 51 affix together, the adapters may also be assembled to one another prior to insertion into the frame. The light pipes 15 may be affixed to the adapters 51 after the frame and adapters have been mounted to a PCB, as illustrated in FIGS. 1 and 4. However, it is preferred that a configurable board mount light pipe array 1 be prefabricated and fully assembled (including frame 29, adapters, and light pipes 15) at a location distant from the PCB and corresponding electronic device.

A sample board mount including a frame 29 having four rails 31 and adapters 51 is illustrated in FIG. 26. For this embodiment, the board mount includes seventy (70) adapters 51 for receiving the ends of seventy (70) light pipes 15. The assembly of rails 31, adapters 51 and light pipes 15 may be affixed together using a press-fit, adhesive, sonic weld, or other locking mechanisms. Furthermore, each corner slot 35 may include a locking tab for locking to a received rail 31. However, locking tabs are not necessary. Furthermore, the ends of the rails 31 that project beyond the corners 33 may be removed to provide a flush appearance and to avoid the rail ends from engaging components on the PCB.

As illustrated in FIGS. 1-7, the configurable board mount light pipe array 1 (including light pipes 15, adapters 51, and rails 31) is affixed to an underlying PCB 3 with an adapter 51 positioned immediately above each LED 5. The rail and adapter assembly may be affixed to the PCB by various connector constructions as can be determined by those skilled in the art such as using a simple adhesive. However, in a preferred embodiment, the rails' include pins 37 which project downwardly in a press-fit engagement to holes formed in the PCB 3. The light pipes' second ends 19 are then positioned to project through the holes 11 of a electronic device panel 9 so that the second ends 19 of the light pipes can be visible. The light pipes' second ends 19 can be constructed as can be determined by one skilled in the art. However, it is preferred that the light pipe's second ends be constructed with a traditional rear mount construction so as to facilitate insertion of the light pipes' second ends 19 through the panel's holes 11. Further, the light pipes may have any shape as necessary to transmit light from the LEDs 5 to the electronic panel 9. As illustrated in FIGS. 1-7, preferred light pipes 15 include a 90° bend. Still alternative preferred light pipes 15 (not shown) are straight such as where a PCB 3 extends parallel to an electronic device's panel 9.

While several particular forms of the invention have been illustrated and described, it will be apparent that various modifications can be made without departing from the spirit and scope of the invention. Accordingly, it is not intended that the invention be limited except by the following claims.

We claim:

1. The board mount light pipe array comprising:
    a frame including four rails forming a rectangle including four sides, four corners, a top and a bottom;
    one or more adapters positioned within said frame, said one or more adapters including a vertically extending channel including a top and bottom, said channel's top formed to include a light pipe receptacle sized and shaped to receive a light pipe, and said channel bottom formed to include an LED receptacle sized and shaped to receive an LED; and
    one or more light pipes, each of said light pipes including a first end and a second end, each of said one or more light pipes' first ends positioned within one of said adapter's light pipe receptacles.

2. The board mount light pipe array of claim 1 wherein said one or more light pipes' first ends are square, and said one or more adapters' light pipes' receptacles are square.

3. The board mount light pipe array of claim 1 wherein said adapters are affixed to said rails by a tongue and groove connection.

4. The board mount light pipe array of claim 1 wherein:
    each of said adapters have four sides and two adjacent adapter sides include a vertically extending tongue and the remaining two adjacent adapter sides include a vertically extending groove, and
    two of said rails are tongue rails which are adjacent to one another and include tongues which affix to the adapters' grooves, and the two remaining said rails are groove rails which are adjacent to one another and include grooves which affix to said adapters' tongues.

5. The board mount light pipe array of claim 4 wherein said adapter's tongues are sized and shaped to affix to another adapter's groove.

6. The board mount light pipe array of claim 1 wherein said each of said rails' corners include a slot, and each of said rails have an end that projects through an adjacent rail's slot.

7. The board mount light pipe array of claim 1 wherein said frame further includes four downwardly extending pins wherein one of said pins extends downwardly from the bottom of each of said four corners.

8. The board mount light pipe array of claim 7 wherein said pins include a serrated deformable surface.

9. The board mount light pipe array assembly comprising:
four rails with each of said four rails including a first end and a corner end, each of said rails' first ends connectable to another rail's corner end to form a rectangular frame including four sides, four corners, a top and a bottom;
one or more adapters which can be positioned within said frame, said one or more adapters including a vertically extending channel including a top and bottom, said channel top formed to include a light pipe receptacle sized and shaped to receive a light pipe, and said channel bottom formed to include an LED receptacle sized and shaped to receive an LED; and
one or more light pipes, each of said light pipes including a first end and a second end, each of said one or more light pipes' first ends sized and shaped to form a press-fit attachment within an adapter's light pipe receptacle.

10. The board mount light pipe array assembly of claim 9 wherein said one or more light pipes' first ends are square, and said one or more adapters' light pipes receptacles are square.

11. The board mount light pipe array assembly of claim 9 wherein said adapters include one or more vertically extending tongues and one or more vertically extending grooves and said rails include one or more vertically extending tongues and one or more vertically extending grooves so that said adapters are capable of affixing to said rails by a tongue and groove connection.

12. The board mount light pipe array assembly of claim 9 wherein:
each of said adapters have four sides and two adjacent adapter sides include a vertically extending tongue and the two remaining adjacent adapter sides include a vertically extending groove, and
two of said rails are tongue rails which include tongues capable of affixing to said adapters' grooves, and the remaining two of said rails are groove rails which include grooves capable of affixing to said adapters' tongues.

13. The board mount light pipe array of claim 12 wherein said adapter's tongues are sized and shaped to affix to another adapter's groove.

14. The board mount light pipe array assembly of claim 9 wherein said each of said rails' corners include a slot, and each of said rails have an end that is sized to project through an adjacent rail's slot.

15. The board mount light pipe array of claim 9 wherein said frame further includes four downwardly extending pins wherein one of said pins extends downwardly from the bottom of each of said four corners.

16. The board mount light pipe array assembly of claim 15 wherein pins include a serrated deformable surface.

* * * * *